(12) United States Patent
Durham et al.

(10) Patent No.: US 9,390,031 B2
(45) Date of Patent: Jul. 12, 2016

(54) PAGE COLORING TO ASSOCIATE MEMORY PAGES WITH PROGRAMS

(75) Inventors: David M. Durham, Beaverton, OR (US); Ravi L. Sahita, Beaverton, OR (US); Dylan C. Larson, Portland, OR (US); Rajendra S. Yavatkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 776 days.

(21) Appl. No.: 11/323,446

(22) Filed: Dec. 30, 2005

(65) Prior Publication Data

US 2007/0157003 A1   Jul. 5, 2007

(51) Int. Cl.
*G06F 12/14* (2006.01)
*G06F 21/74* (2013.01)
*G06F 21/79* (2013.01)

(52) U.S. Cl.
CPC ........ *G06F 12/1475* (2013.01); *G06F 12/1491* (2013.01); *G06F 21/74* (2013.01); *G06F 21/79* (2013.01)

(58) Field of Classification Search
CPC . G06F 12/1475; G06F 12/1491; G06F 21/74; G06F 21/79
See application file for complete search history.

(56) References Cited

U.S. PATENT DOCUMENTS

| | | | |
|---|---|---|---|
| 3,916,385 A | 10/1975 | Parmar et al. | |
| 4,809,160 A * | 2/1989 | Mahon et al. | 726/4 |
| 4,821,169 A | 4/1989 | Sites et al. | |
| 6,009,503 A * | 12/1999 | Liedtke | 711/203 |
| 6,048,940 A | 4/2000 | Bladel et al. | |
| 6,823,433 B1 | 11/2004 | Barnes et al. | |

FOREIGN PATENT DOCUMENTS

| | | |
|---|---|---|
| EP | 0428079 A2 | 5/1991 |
| JP | 03-244054 A | 10/1991 |
| WO | 2007/079011 A2 | 7/2007 |
| WO | 2007/079011 A3 | 11/2007 |

OTHER PUBLICATIONS

Mahon et al.,Hewlett Packard Precision Architecture:The Processor,Aug. 1986,Hewlett Packard,19 pages □ □ .*

(Continued)

*Primary Examiner* — Gary W Cygiel
(74) *Attorney, Agent, or Firm* — Thomas R. Lane

(57) ABSTRACT

Apparatuses and methods for page coloring to associate memory pages with programs are disclosed. In one embodiment, an apparatus includes a paging unit and an interface to access a memory. The paging unit includes translation logic and comparison logic. The translation logic is to translate a first address to a second address. The first address is to be provided by an instruction stored in a first page in the memory. The translation is based on an entry in a data structure, and the entry is to include a base address of a second page in the memory including the second address. The comparison logic is to compare the color of the first page to the color of the second page. The color of the first page is to indicate association of the first page with a first program including the first instruction. The data structure entry is also to include the color of the second page to indicate association of the second page with the first program or a second program.

19 Claims, 3 Drawing Sheets

(56) References Cited

OTHER PUBLICATIONS

Wilkes et al., A comparison of Protection Lookaside Buffers and the PA-RISC protection architecture, Mar. 1992, Hewlett-Packard, 13 pages.*

International Search Report and Written Opinion received for PCT Application No. PCT/US2006/048940, mailed on Sep. 25, 2007, 15 pages.

International Preliminary Report on Patentability received for PCT Application No. PCT/US2006/048940, issued on Jul. 1, 2008, 8 pages.

Office Action Received for Chinese Patent Application No. 200680049912.1, mailed on Jun. 10, 2010, 4 Pages of Chinese Office Action, and 7 Pages of English Translation.

Notice of Preliminary Rejection for Korean Patent Application No. 10-2008-7015716, mailed on Apr. 20, 2010, 5 Pages of Korean Office Action, and 5 Pages of English Translation.

Office Action Received for Japenese Patent Application No. 2008-541443, mailed on Jun. 15, 2010, 2 Pages of Japenese Office Action, and 2 Pages of English Translation.

Min, Rui et al., "Improving Performance of Large Physically Indexed Caches by Decoupling Memory Addresses From Cache Addresses", IEEE Transactions on Computers, vol. 50, No. 11, Nov. 2001, pp. 1191-1201.

Office Action Received for Korean Patent Application No. 10-2008-7015716 mailed on Dec. 31, 2010, 3 Pages of Korean Office Action, and 3 Pages of English Translation.

Office Action Received for Korean Patent Application No. 10-2008-7015716 mailed on Jul. 27, 2012, 10 Pages of Korean Office Action, and 4 pPages of English Translation.

* cited by examiner

PAGE COLORING TO ASSOCIATE MEMORY PAGES WITH PROGRAMS

BACKGROUND

1. Field

The present disclosure pertains to the field of information processing, and, more specifically, to the field of memory management and protection.

2. Description of Related Art

Memory based attacks are a significant threat to the security of information processing systems. Some such attacks involve storing malicious code, such as a virus or a worm, in the memory of a computer system, then exploiting bugs and/or buffer overflows while running legitimate programs to transfer control to the malicious code. One approach to preventing this type of attack is to include an "execute disable" bit in a page table entry that may be used to designate pages where data is stored as non-executable, so that malicious code could not be stored as data and subsequently executed within the same physical, linear or logical memory space. However, memory based attack techniques are becoming increasingly sophisticated, and additional approaches to preventing such attacks may be desired. This includes protections from buffer overflows that execute existing code or corrupt memory, malicious kernel or application components, rootkits, spyware, and computer viruses. It also includes protections from buggy code such as runaway pointers that corrupt data in other programs or subprograms within a linear address space.

BRIEF DESCRIPTION OF THE FIGURES

The present invention is illustrated by way of example and not limitation in the accompanying figures.

DETAILED DESCRIPTION

The following description describes embodiments of techniques for page coloring to associate memory pages with programs and their associated data. In the following description, numerous specific details such as processor and system configurations are set forth in order to provide a more thorough understanding of the present invention. It will be appreciated, however, by one skilled in the art that the invention may be practiced without such specific details. Additionally, some well known structures, circuits, and the like have not been shown in detail, to avoid unnecessarily obscuring the present invention.

Embodiments of the present invention provide for assigning an attribute to memory pages to be used to associate specific pages with specific programs and data. The attribute is referred to as a page "color" and may be used to logically partition memory at a granularity fine enough to prevent one program from accessing the memory space of another program, or even parts of a single program from accessing the memory space of other parts of the same program. Techniques according to embodiments of the present invention may be implemented within existing page-based memory management data structures or, nested page-based memory management data structures used by virtualization technologies, so that the use of embodiments of the present invention does not degrade performance due to additional memory accesses for retrieving color information. Other techniques may include parallel page table structures are retrieved from memory and loaded into their associated translation lookaside buffer ("TLB") hardware whenever a corresponding page table entry is fetched from memory.

Figure 1:
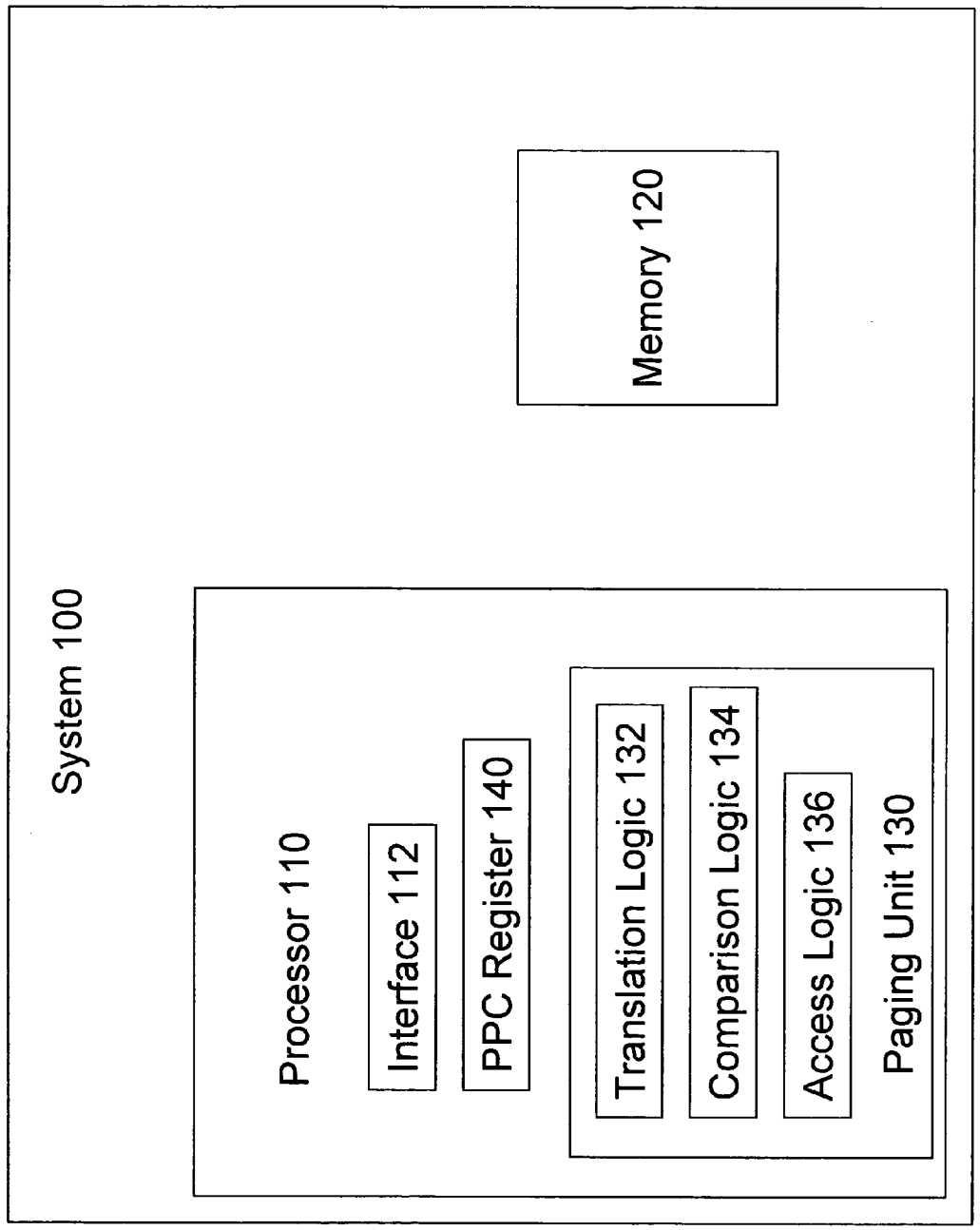
FIG. 1 illustrates an embodiment of the invention in a processor including logic for page coloring to associate memory pages with programs.

FIG. 1 illustrates an embodiment of the invention in a processor, processor 110, including logic for page coloring to associate memory pages with programs. Processor 110 is shown in system 100, which also includes memory 120.

Processor 110 may be any of a variety of different types of processors, such as a processor in the Pentium® Processor Family, the Itanium® Processor Family, or other processor family from Intel Corporation, or any other general purpose or other processor from another company. Although FIG. 1 illustrates the invention embodied in a processor, the invention may alternatively be embodied in any other type of data processing component or apparatus. In the embodiment of FIG. 1, processor 110 includes interface 112 and paging unit 130.

Interface 112 may be a bus unit or any other unit, port, or interface to allow processor 110 to communicate with memory 120 through any type of bus, point to point, or other connection, directly or through any other component, such as a chipset or memory controller.

Paging unit 130 includes translation logic 132, comparison logic 134, and access logic 136. Translation logic is to perform address translation, as described below. Comparison logic is to compare page colors, as described below. Access logic 136 is to prevent or allow accesses to specific pages based on page color, as described below.

Translation logic 132 performs address translations, for example the translation of a logical or linear address to a physical address, according to any known page-based memory management technique. To perform address translations, translation logic 132 refers to one or more data structures stored in processor 110, memory 120, any other storage location in system 100 not shown in FIG. 1, and/or any combination of these components and locations. The data structures may include page directories and page tables according to the architecture of the Pentium® Processor Family, as modified according to embodiments of the present invention, and/or a table stored in a TLB.

In one embodiment, translation logic 132 receives a linear address provided by an instruction to be executed by processor 110. Translation logic 132 uses portions of the linear address as indices into hierarchical tables, including page tables. The page tables contain entries, each including a field for a base address of a page in memory 120, for example, bits 39:12 of a page table entry according to the Pentium® Processor Family's Extended Memory 64 Technology. Any page size (e.g., 4 kilobytes) may be used within the scope of the present invention. Therefore, the linear address used by a program to access memory 120 may be translated to a physical address used by processor 110 to access memory 120.

Comparison logic 134 compares the page color of the page found by translation logic 132 to the page color of the page containing the instruction that provided the linear address. The comparison may be performed according to any known approach. A page color is an attribute of a page represented by a value stored in an entry in a data structure used by translation logic 132 to perform address translations. For example, a page color may be represented by an eight bit field in a page table entry, for example, bits 47:40 of a page table entry according to the Pentium® Processor Family's Extended Memory 64 Technology. Therefore, a color value for a page may be any one of 256 values, similar to defining a color value for a pixel in a graphical display by using an eight bit field to provide an index into a 256 entry color table.

Access logic 136 uses the result from comparison logic 136 to prevent or allow the instruction to access the page found by translation logic 134. In one embodiment, access logic 136 may allow the access when the page color of the page containing the instruction is the same as the page color of the page found by translation logic 134, and prevent the access when the page colors are different. Access logic 136 may prevent the access by triggering a page fault exception.

Therefore, an operating system or other supervisor program may assign a certain page color to all pages from one program that it loads into memory, and a different page color to all pages from another program that it loads into memory, and so on, such that one program may not access pages associated with another program even if both programs reside within the same linear or logical address space. Different page colors may also be assigned to different parts of a single program, such that critical program components or data structures may only be accessed using special function calls or through specific entry points.

Access logic 136 may determine whether to allow access based on additional criteria. For example, one color value (e.g., 0x00) may represent no color, such that a page marked with no color may be accessed by any other page. Also, a page table entry may include a field or bit, such as bit 48 of a page table entry according to the Pentium® Processor Family's Extended Memory 64 Technology, which defines whether the page is hidden. The bit may be set to zero to allow any other page to read from the referenced page, regardless of the result of the color comparison, or set to one to enable access logic 136 to prevent or allow read accesses based on the color comparison.

Access logic 136 may also determine whether to allow access based on instruction control flow. For example, an instruction may be used to mark allowed entry points to a program. In an embodiment according to the architecture of the Pentium® Processor Family, a new instruction (e.g. a "Directed Address Vector" or "DAV" instruction) may be added for this purpose. If a jump or other control flow instruction is executed from a page of one color to a DAV instruction in a page of another color, the access will be allowed. However, the jump is to a page of another color but not to a DAV instruction, the access will not be allowed. Therefore, the DAV instruction may be used to allow entry into a program only at an expected point which may provide a defined, secure interface. Jumps to random or unexpected sections of a program from a program of another color may be prevented. The DAV instruction may also use a variable parameter to perform a color comparison to determine if a program of an expected color is attempting to access the program implementing the DAV identified entry point. Finally, the DAV instruction may only be executed in pages that are executable (e.g., not eXecute Disabled using the XD bit according to the architecture of the Pentium® Processor Family),assuring that data pages with spurious bit sequences appearing to be a DAV instruction will not be executed by the processor.

Access logic 136 may also be used to implement special coloring techniques. In one embodiment, a special page color (e.g., 0xFF) may be allocated for operating system components that are allowed to jump into any portion of a program of another color. A jump instruction from a page of this color may always be allowed by access logic 136. This color may be used by operating system schedulers and interrupt service routines to allow them to resume execution of an interrupted program from the point of interruption without incurring a page fault. A page of this color may not have write access to pages of another color or read access to hidden pages of another color. In another embodiment, special colors may be used for supervisor pages that have full read and write access to pages of other colors. These special colors may be used by operating system components to verify other programs and modify their contents when required. Other colors may be associated with access to restricted processor registers, restricted processor instructions, or advanced programmable interrupt controller ("APIC") associated memory locations. Only programs colored with a privileged color would be able to access the restricted processor features associated with the privileged color. In another embodiment, a page marked with no color, as discussed above, may not be protected from pages of other colors or other pages with no color. Pages that are assigned a color, however, may not be write or jump accessible by pages with no color.

Furthermore, access logic 136 may also report whether a page fault was caused by a page color mismatch or violation. For example, a bit in a page fault error code (e.g., bit 5 of the page fault error code pushed onto the stack according to the architecture of the Pentium® Processor Family) may be designated as a page color violation bit, to be set to one to indicate that the page fault was triggered by a color mismatch. This bit may be interpreted in the context of other flags. For example, if the page color violation was caused by an instruction fetch, an instruction fetch bit in the error code may be set to one. If the page color violation was caused by a read or a write, a read/write bit may be set to a zero for a read or a one for a write. Additionally, the linear address of the page that caused the fault may be saved, for example in the CR2 control register of a processor according to the architecture of the Pentium® Processor Family.

Processor 110 may also include read-only register 140 or other storage location to support transitioning from one program to another program, as described above using the DAV instruction. In one embodiment this register may be referred to as a "previous page color" or "PPC" register. Access logic 136 may detect a mismatch in page color when processor 110 begins fetching instructions from a page of a different color than the currently executing instruction. Access logic 136 may allow this fetching according to the DAV instruction protocol discussed above, and allow the page color to change, but save the previous page color in PPC register 140. Therefore, instructions from the new page may query PPC register 140 to determine the previous page color, so that programs may control access to their services by determining which programs of differing colors are allowed to access the presently executing program at a particular DAV defined entry point. Transitions caused by pages of special color may not be stored in PPC register 140, so an operating system scheduler induced transition need not be noted as a page color transition, but rather as an interrupt and return.

In FIG. 1, memory 120 may be static or dynamic random access memory, semiconductor-based read only or flash memory, magnetic or optical disk memory, any other type of medium readable by processor 120, or any combination of such mediums.

Figure 2:
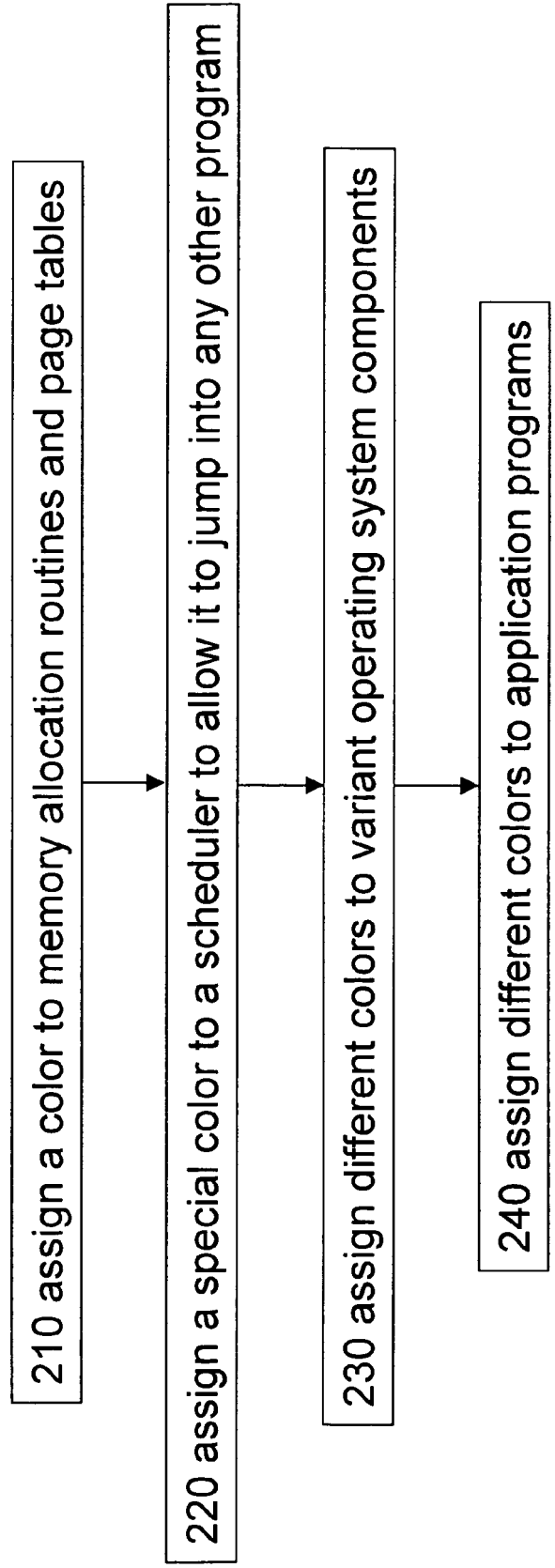
FIG. 2 illustrates an embodiment of the invention in a method for initializing page coloring to associate memory pages with programs.

FIG. 2 illustrates an embodiment of the present invention in a method, method 200, for initializing page coloring to associate memory pages with programs. In block 210, an operating system loader loads memory allocation routines into memory and creates page table structures in memory, all with a first color, so that the memory allocation routines may set individual page colors for subsequently loaded routines and programs, while protecting the memory manager and page tables from these other routines and programs, even if they run at the same privilege level as the memory manager. In block 220, the scheduler is loaded and colored 0xFF, to allow it to jump into any other program, schedule threads, and multitask. Additionally, pages of this special color may be configured by the operating system to hook legacy program interfaces without DAV instructions to protect legacy programs and ensure proper control flow between legacy programs and sub-programs.

In block 230, variant components of the operating system are loaded into memory and assigned different page colors. For example, drivers may be loaded from disk, integrity checked by validating vendor signatures, and as they are loaded into memory, assigned page colors to protect them from other kernel components. A driver may then allocate memory of the same color as itself.

In block 240, application programs are loaded into memory and assigned different page colors. As pages are colored, the invariant application programming interfaces of the operating system may allow programs to query the colors of other programs given their signature and validated image. Data structures may be shared as readable to programs of other colors, but only if the pages are not marked as hidden. In this way, one way first-in first-out buffers may be constructed such that there is a single writer and multiple readers of the data.

It is also possible for the owner of a page of one color to request of the operating system that one of its page colors be changed to that of another program's after the original program has completed writing to that page. In this way, ownership of pages may change hands by signaling to operating system invariants such as the memory manager. This request may be safely honored by the operating system provided that the page changing ownership (changing color) is eXecute Disabled (XD bit is set) containing only non-executable data, so that the contents cannot be subsequently executed by a program of another color after a color change.

Figure 3:
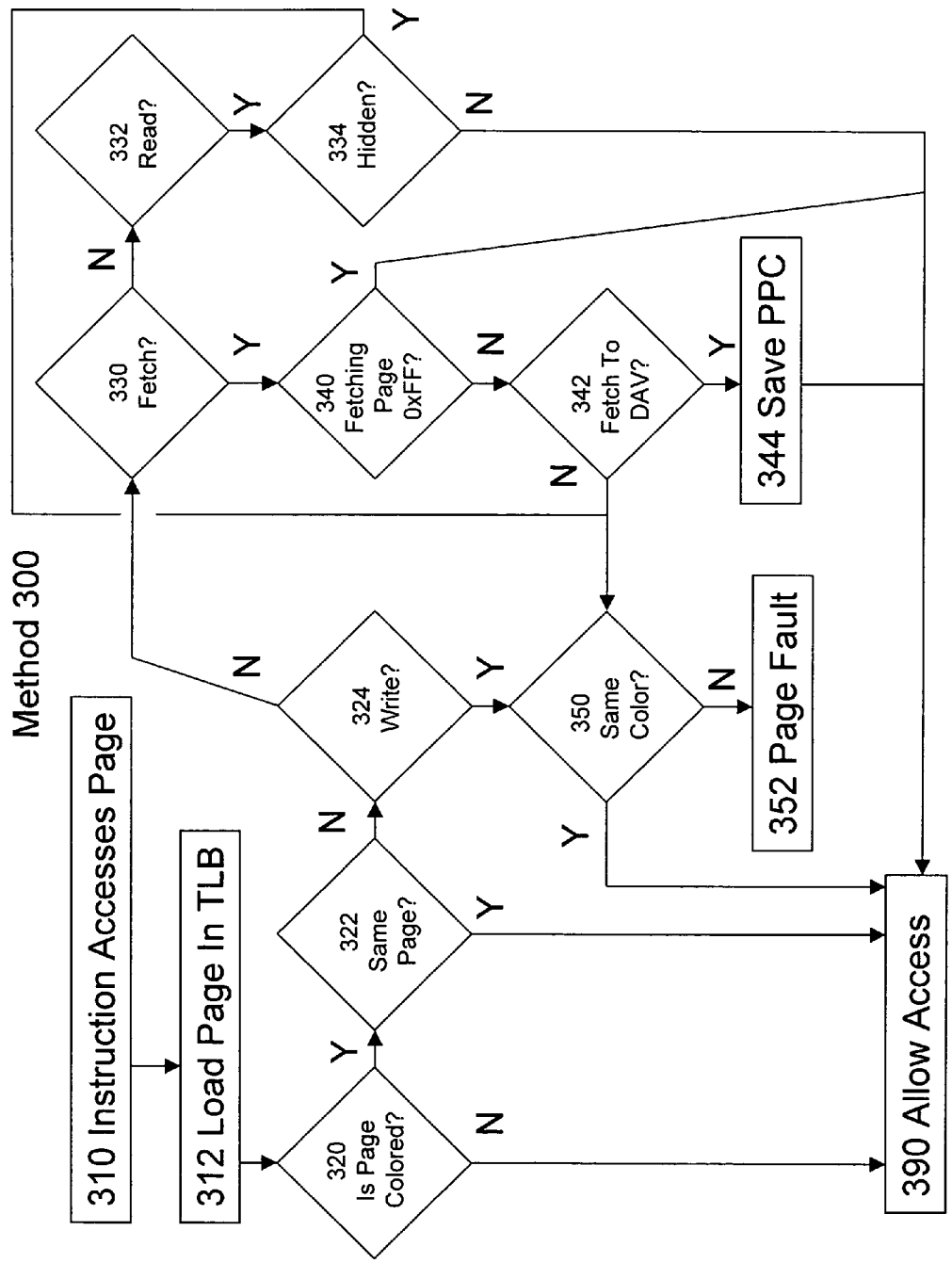
FIG. 3 illustrates an embodiment of the invention in a method for page coloring to associate memory pages with programs.

FIG. 3 illustrates an embodiment of the present invention in a method, method 300, for page coloring to associate memory pages with programs. In block 310, an instruction attempts to access a page in memory. In block 312, the page is loaded into a TLB, and the color and permissions of the page are noted. In block 320, a determination is made as to whether the page is colored (e.g., color value is not 0x00). If it is not colored, then, in block 390, the access to the page is allowed.

If, in block 320, the page is colored, then, in block 322, a determination is made as to whether the page is the page that contains the instruction. If so, then, in block 390, the access to the page is allowed. If not, then, in block 324, a determination is made as to whether the access is a write.

If, in block 324, the access is a write, then, in block 350, a determination is made as to whether the page is the same color as the page containing the accessing instruction. If not, then, in block 352, the access is prevented by triggering a page fault. If so, then, in block 390, the access to the page is allowed.

If, in block 324, the access is not a write, then, in block 330, a determination is made as to whether the page access is due to an instruction fetch. If not, then, in block 332, a determination is made as to whether the access is a read. If the access is a read, then, in block 334, a determination is made as to whether the page's hidden bit is set. If the hidden bit is not set, then, in block 390, the access to the page is allowed. If the hidden bit is set, then, in block 350, a determination is made as to whether the page is the same color as the page containing the accessing instruction. If not, then, in block 352, the access is prevented by triggering a page fault. If so, then, in block 390, the access to the page is allowed.

Returning to block 330, if the page access is due to an instruction fetch, then, in block 340, the color of the page containing the fetch instruction is check to determine whether it is allowed to jump to pages of another color (e.g., its color is 0xFF). If so, then, in block 390, the access to the page is allowed. If not, then, in block 342, a determination is made as to whether the fetched instruction is a DAV instruction. If so, then, in block 344, the page color of the fetching instruction is saved in the PPC register, and, in block 390, the access to the page is allowed. If not, then in block 350, a determination is made as to whether the page is the same color as the page containing the accessing instruction. If not, then, in block 352, the access is prevented by triggering a page fault. If so, then, in block 390, the access to the page is allowed.

Within the scope of the present invention, methods 200 and 300 may be performed in different orders, with additional blocks performed simultaneously, with illustrated blocks omitted, with additional blocks added, or with a combination of reordered, combined, omitted, or additional blocks.

Thus, techniques for page coloring to associate memory pages with programs are disclosed. While certain embodiments have been described, and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. an apparatus comprising:
an interface to access a memory;
a processor to execute a jump instruction to be stored in a first page in the memory, the jump instruction to include a linear address to be translated to a physical address in a second page in the memory, the first page to have one of a first page color and a special page color, the second page to have a second page color; and
a paging unit including:
translation hardware to translate, based on a first entry in a translation lookaside buffer, the linear address to the physical address, wherein the first entry is to include a base address of the second page and the second page color is to indicate association of the second page with one of a first program and a second program; and
comparison hardware to compare the page color of the page to be found by the translation hardware to a page table's page color entry for the page to contain the jump instruction that is to provide the linear address, wherein the page table's page color entry for the page to contain the jump instruction is to be one of the first page color and the special page color and is to be stored in a page color field of a page table entry, wherein the bit addresses of the page color field are greater than the bit addresses of the address field in the page table entry, the first page color is to be stored in a second entry in the translation lookaside buffer to indicate association of the first page with the first program, the first program to include the jump instruction, and the special page color is to indicate that jumps are allowed from the first page to pages of a different color than the first page color; and access hardware to prevent the first page from accessing the second page if the page color of the page to be found by the translation hardware and the page table's page color entry for the page to contain the jump instruction are different, unless the first page is to have the special page color.

2. The apparatus of claim 1, wherein the access logic is to prevent the first page from accessing the second page by triggering a page fault exception.

3. The apparatus of claim 2, wherein the access hardware is also to report in an error code the prevention of the first page from accessing the second page as a page color violation.

4. The apparatus of claim 1, wherein the access hardware is to allow the first page to access the second page if the color of the second page is set to indicate that the second page is not colored.

5. The apparatus of claim 1, wherein the access hardware is to allow the first page to access the second page if the access is a read access and the entry also includes an indication that the second page is not hidden.

6. The apparatus of claim 1, wherein the access hardware is to allow the first page to access the second page if the access is one of a jump and a call to an allowed entry point instruction within the second page.

7. The apparatus of claim 1, further comprising a storage location to store the color of the first page if the instruction is a one of jump and a call instruction and the one of the jump and the call is allowed.

8. A method comprising:
translating, based on an entry in a translation lookaside buffer, a first address to a second address, wherein the entry is to include a base address and a color of an accessible page in the memory, the accessible page including the second address, and wherein the first address includes a linear address to be provided by an instruction stored in an accessing page in the memory;
comparing the page color of the page found by the translation to a page table's page color entry for the page containing the instruction that provided the linear address, wherein the page color is stored in a page color field of a page table entry, wherein the bit addresses of the page color field are greater than the bit addresses of the address field in the page table entry;
preventing the accessing page from accessing the accessible page if the color of the page found by the translation is different from the page table's page color entry for the page containing the instruction that provided the linear address, unless the access is one of a jump and a call and the color of the accessing page is set to a special page color indicate that jumps and calls are allowed from the accessing page to pages of a different color than the color of the accessing page.

9. The method of claim 8, further comprising allowing the accessing page to access the accessible page if the accessible page is not colored.

10. The method of claim 8, further comprising preventing the accessing page from accessing the accessible page if the access is a read access, the color of the accessing page is different than the color of the accessible page, and the accessible page is hidden.

11. The method of claim 8, further comprising:
loading a portion of a scheduler into the accessing page;
setting the color of the accessing page to indicate that jumps are allowed from the accessing page to pages of different colors than the color of the accessing page.

12. The method of claim 8, further comprising allowing the accessing page to access the accessible page if the access is an instruction fetch to an allowed entry point.

13. The method of claim 12 further comprising comparing the color of the accessible page to a color indicating that jumps and calls are allowed from the accessing page to the allowed entry point.

14. The method of claim 8, further comprising referencing a page table to find the color of the accessible page.

15. The method of claim 8, further comprising:
loading a portion of a memory management routine to the accessing page;
creating a page table in the accessible page;
setting the color of the accessing page and the accessible page to one of a plurality of colors;
loading a portion of an application program to an application program page in the memory; and
setting a color of the application program page to an other of the plurality of colors.

16. The method of claim 8, further comprising:
loading a portion of a program into the accessing page;
setting the color of the accessing page to indicate that access to restricted processor registers, advanced programmable interrupt controller memory regions, and restricted processor instructions are allowed from the accessing page to manage the state of a processor.

17. The method of claim 8, further comprising:
changing the color of an execute disabled page by an instruction in a program stored in the accessible and execute disabled pages; and
setting a parameter to prevent instructions stored in the execute disabled page from being executed.

18. A system comprising:
a dynamic random access memory; and
a processor coupled to the memory, including a paging unit having:
translation logic to translate, based on an entry in a translation lookaside buffer, a first address to a second address, wherein the entry is to include a base address and a color of an accessible page in the memory, the accessible page to include the second address, and wherein the first address is to be provided by an instruction to be stored in an accessing page in the memory; and
comparison logic to compare a color of the page to be found by the translation hardware to a page table's page color entry for the page to contain the jump instruction that is to provide the linear address, wherein the page table's page color entry for the page to contain the jump instruction that is to provide the linear address is to indicate association of the accessing page with a first program to include the first instruction and is to be stored in a page color field of a page table entry, wherein the bit addresses of the page color field are greater than the bit addresses of the address field in the page table entry, and the color of the page found by the translation hardware is to indicate association of the accessible page with one of the first program and a second program; and
access logic to prevent the accessing page from accessing the accessible page if the color of the page to be found by the translation hardware and the page color of the page to contain the jump instruction are different, unless the instruction is one of a jump and a call instruction and the color of the accessing page is to be set to a special page color to indicate that jumps and calls are to be allowed from the accessible page to pages of a different color than the color of the accessing page.

19. The system of claim 18, wherein the dynamic random access memory is to store the data structure.

\* \* \* \* \*